United States Patent

Temple et al.

(10) Patent No.: US 10,452,869 B2
(45) Date of Patent: Oct. 22, 2019

(54) SYSTEMS AND METHODS FOR PROCESSING AND VERIFYING DATA USING SIGNATURES (71) Applicant: Infineon Technologies AG, Neubiberg (DE)

(72) Inventors: Christopher Temple, Munich (DE); Dian Tresna Nugraha, Munich (DE); Edward Wiley, Howell, MI (US); Laurent Heidt, Munich (DE)

(73) Assignee: Infineon Technologies AG, Neubiberg (DE)

( * ) Notice: Subject to any disclaimer, the term of this patent is extended or adjusted under 35 U.S.C. 154(b) by 199 days.

(21) Appl. No.: 14/271,866

(22) Filed: May 7, 2014

(65) Prior Publication Data

US 2015/0324599 A1 Nov. 12, 2015

(51) Int. Cl.
G06F 21/64 (2013.01)
G06F 21/62 (2013.01)
H04L 9/32 (2006.01)

(52) U.S. Cl.
CPC .......... *G06F 21/64* (2013.01); *G06F 21/6218* (2013.01); *H04L 9/3239* (2013.01); *H04L 9/3247* (2013.01); *H04L 2209/72* (2013.01)

(58) Field of Classification Search
CPC ... G06F 21/64; G06F 21/6218; H04L 9/3239; H04L 9/3247
See application file for complete search history.

(56) References Cited

U.S. PATENT DOCUMENTS

| | | | |
|---|---|---|---|
| 2004/0186779 A1* | 9/2004 | Yamamichi et al. | 705/14 |
| 2005/0238019 A1* | 10/2005 | Vasudevan | H04L 49/90 370/389 |
| 2010/0111294 A1* | 5/2010 | Soppera | G06Q 10/08 380/28 |
| 2011/0083064 A1* | 4/2011 | Kagan | H04L 63/123 714/807 |
| 2011/0252418 A1* | 10/2011 | Havivi et al. | 718/1 |
| 2012/0072732 A1* | 3/2012 | Canard et al. | 713/176 |
| 2013/0159730 A1* | 6/2013 | Asim et al. | 713/189 |
| 2013/0326224 A1* | 12/2013 | Yavuz | H04L 9/3247 713/176 |
| 2013/0346755 A1* | 12/2013 | Nguyen | H04L 9/008 713/176 |
| 2014/0281554 A1* | 9/2014 | Maletsky et al. | 713/175 |

* cited by examiner

*Primary Examiner* — Farid Homayounmehr
*Assistant Examiner* — Suman Debnath
(74) *Attorney, Agent, or Firm* — Schiff Hardin LLP (57) ABSTRACT According to an example, a device for processing data is suggested, said device comprising a first component, wherein the first software component is arranged for receiving the data; a security processor for receiving said data and a first signature, wherein the security processor is arranged for determining based on the first signature whether the data are valid; for determining a second signature for the data; and for conveying the second signature to the first component.

35 Claims, 2 Drawing Sheets

SYSTEMS AND METHODS FOR PROCESSING AND VERIFYING DATA USING SIGNATURES

BACKGROUND OF THE INVENTION

Embodiments of the present invention in particular relate to processing data within a device, e.g., a processor, which may in particular comprise several hardware and/or software layers that may result in corrupted data.

SUMMARY

A first embodiment relates to a device for processing data comprising:
  a first component, wherein the first software component is arranged for receiving the data;
  a security processor for receiving said data and a first signature, wherein the security processor is arranged
    for determining based on the first signature whether the data are valid;
    for determining a second signature for the data; and
    for conveying the second signature to the first component.

A second embodiment relates to a device for processing data comprising:
  a first component, wherein the first component is arranged for receiving the data;
  a second component;
  a security processor for receiving said data and a first signature, wherein the security processor is arranged
    for determining based on the first signature whether the data are valid;
    for informing the first component whether the data are valid;
  wherein the first component is arranged for determining a second signature for the data and for conveying the second signature and the data to the second component.

A third embodiment relates to a device for processing data comprising:
  a security processor,
  a first component, wherein the first component is arranged
    for conveying said data and a third signature to the security processor,
  wherein the security processor is arranged
    for determining based on the third signature whether the data are valid;
    for determining a first signature;
    for conveying the data and the first signature towards a network.

A forth embodiment is directed to a method for processing data at a device, said method comprising
  receiving the data and a first signature at a security processor of the device;
  receiving the data at a first component;
  determining by the security processor based on the first signature whether the data are valid;
  determining a second signature for the data;
  conveying the second signature to the first component of the device.

A fifth embodiment is directed to a method for processing data at a device, said method comprising
  receiving the data and a first signature at a security processor of the device;
  receiving the data at a first component of the device;
  determining by the security processor based on the first signature whether the data are valid;
  determining by the first component whether the data are valid based on an information provided by the security processor;
  determining a second signature for the data by the first component;
  conveying the second signature and the data to the second component.

A sixth embodiment relates to a device comprising:
  means for receiving the data and a first signature at a security processor of the device;
  means for receiving the data at a first component;
  means for determining by the security processor based on the first signature whether the data are valid;
  means for determining a second signature for the data;
  means for conveying the second signature to the first component.

A seventh embodiment is directed to a computer program product directly loadable into a memory of a digital processing device, comprising software code portions for performing the steps of the method described herein.

BRIEF DESCRIPTION OF THE DRAWINGS

Embodiments are shown and illustrated with reference to the drawings. The drawings serve to illustrate the basic principle, so that only aspects necessary for understanding the basic principle are illustrated. The drawings are not to scale. In the drawings the same reference characters denote like features.

DETAILED DESCRIPTION OF THE PREFERRED EMBODIMENTS

A security processor may be a high security module (HSM) that may in particular perform cryptographic operations yielding cryptographic signatures. Cryptographic signatures may be compared with reference signatures that typically originate from an external source. If the security processor is utilized to check an authenticity of message data (also referred to as "data") within its context, a signature (e.g., message authentication code, MAC) cannot be utilized to facilitate an end-to-end protection between the context of a software component in an application layer of a first device (e.g., processor) and a software component in an application layer of a second device (e.g., processor). Data described herein may be any kind of message data or payload that could be conveyed via two devices.

Figure 1:
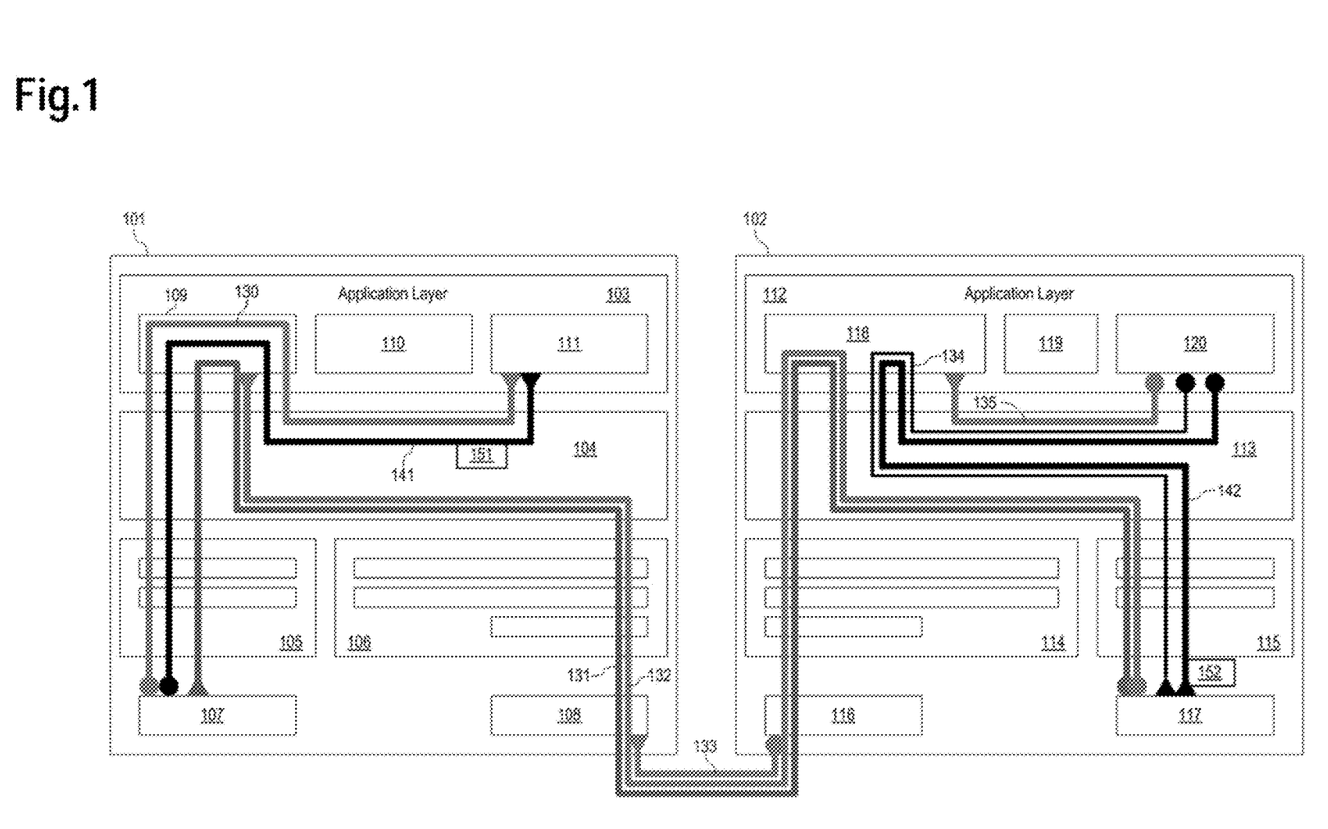
FIG. 1 shows communication of message data from a first device to a second device, wherein each device comprises a security processor and an internal signature is used within each device in order to ensure end-to-end integrity of data.

FIG. 1 shows communication of message data from a first device 101 to a second device 102.

The first device 101 comprises an application layer 103, additional software and/or hardware layers 104, 105, 106 (hereinafter referred to as "layers"), a security processor 107 and a network interface 108. The application layer 103 comprises several software components 109, 110 and 111. The second device 102 comprises an application layer 112, additional software and/or hardware layers 113, 114, 115 (hereinafter referred to as "layers"), a security processor 116 and a network interface 117. The application layer 112 comprises several software components 118, 119 and 120.

It is noted that the software component described herein may also be realized as a hardware component with the respective device. In particular, each layer may comprise at least one software and/or hardware component.

The software component 111 in the application layer 103 of the device 101 generates message data which is conveyed via the software component 109, the layers 104 and 105 to the security processor 107 (see connection 130). A MAC signature for this message data is determined by the security processor 107. The MAC signature (see connection 131) is conveyed from the security processor 107 via the layers 105 and 104 to the software component 109. The software component 109 conveys the message data together with the MAC signature via the layers 104 and 106 to the network interface 108. The network interface 108 determines a network signature and conveys the message data, the MAC signature and the network signature to the network interface 116 of the device 102 (see connections 131, 132 and 133).

The network interface 116 of the device 102 determines based on the network signature the integrity of the message data and the MAC signature and may then convey the message data and the MAC signature via the layers 114 and 113 to the software component 118, which forwards the message data and the MAC signature via the layers 113 and 115 to the security processor 117 (see connections 131, 132).

The security processor 117 determines whether the MAC signature for the message data is valid and conveys a MAC result (i.e. a result of such comparison) via the layers 115 and 113 to the software component 118 (see connection 134). If the MAC result indicates valid message data, the software component 118 conveys the message data via the layer 113 to the software component 120 (see connection 135). The software component 120 may then conduct a predefined action based on the message data obtained.

Hence, the message data flow is indicated by the connections 130, 132 and 135. The MAC signature flow is indicated by the connection 131, the network signature flow is indicated by the connection 133 and the MAC result flow is indicated by the connection 134. The network signature may be a cyclic redundancy code (CRC) to protect the integrity of the message data (and the MAC signature) conveyed between the devices 101 and 102 via the network.

This scenario bears the disadvantage that the message data may be corrupted before arriving at the security processor 107. Such corruption remains undetectable, because the MAC signature is determined based on the message data arriving at the security processor 107.

It also bears the disadvantage that any corruption of data within the device 102 remains undetectable that occurs beyond the security processor 117, i.e. between the security processor 117 and the software component 120.

Hence, examples described herein in particular suggest adding at least one safety measure that allows determining whether data may be corrupted prior to being received at a security processor deployed on a transmitting side (i.e. said device 101) or after being received at a security processor deployed on a receiving side (i.e. said device 102).

With regard to the transmitting side (i.e. the device 101), a signature 151 may be determined based on the message data and this signature 151 may be conveyed from the software component 111 to the security processor 107 as indicated by a connection 141. The connection 141 may traverse the same layers and components as does the connection 130 that is used for the message data. It is also an option that the signature 151 is conveyed together with the message data, e.g., in a data packet or container of any kind. The signature 151 may be determined by the software component 111 based on a known algorithm as, e.g., a cyclic redundancy check, a hash function, etc. Hence, a variation of the message data that may be caused along the way from the software component 111 to the security processor 107 can be detected at the security processor 107. This can be achieved by applying the known algorithm on the message data and comparing the result with the signature 151. Hence, the message data may be determined to be invalid if the result is not the same as the signature (or if it cannot be derived from the signature based on a known mechanism); in such case, the security processor 107 may conduct a predetermined action, e.g., issue a notification, stop the further processing of the message data towards the device 102, etc.

If the signature 151 is determined to be correct for the message data received, the security processor 107 may continue as described above, i.e. calculate said MAC signature that is to be conveyed via said connection 131.

With regard to the receiving side (i.e. the device 102), a signature 152 may be determined based on the message data received at the security processor 117. This is in particular an option in case the message data's integrity has been confirmed by the security processor 117. The signature 152 is transmitted from the security processor 117 towards the software component 120 via a connection 142 (in this example via the layers 115, 113, the software component 118 and again via layer 113) to allow for this software component 120 to determine whether the message data received (via the connection 135) are the same message data that were determined to be correct by the security processor 117. It is an option that the signature 152 is conveyed together with the message data, e.g., in a data packet or container of any kind, from the software component 118 to the software component 120. The signature 152 may be determined by the security processor 117 based on a known algorithm as, e.g., a cyclic redundancy check, a hash function, etc. Hence, a variation of the message data that may be caused along the way from the software component 118 to the software component 120 can be detected at the software component 120 by applying the known algorithm on the message data and comparing the result with the signature 152. Hence, the message data may be determined to be invalid if the result is not the same as the signature 152 (or if it cannot be derived from the signature 152 based on a known mechanism); in such case, the software component 120 may conduct a predetermined action, e.g., issue a notification, stop any processing of the message data, etc.

It is noted that the MAC result that is conveyed via the connection 134 (indicating whether the integrity of the message data received at the security processor 117 could be confirmed (or not)) may be optionally sent in addition to the signature 152.

Basically, there are several options to let the software component 118 and/or the software component 120 know whether or not the security processor 117 could confirm the integrity of the message data received, e.g.:

(a) The software component 118 may be informed by the security processor via the signature 152 that the integrity of the message data received at the security processor has been confirmed (via the MAC signature). If the software component 118 obtains the signature 152 it may use this signature 152 to verify the integrity of the message data also received at the software component 118 (see connection 132). If the integrity can be verified, the software component 118 may process the message data (one option may be to (also) forward the message data and the signature 152 to the software component 120). If the integrity cannot be verified, the software component may initiate a predetermined action, e.g., indicate an error and/or send a (failure) message to another component. The signature 152 may be a non-cryptographic signature or any signature that requires less computing power compared to, e.g., a cryptographic signature. The signature 152 may in particular be a CRC, a hash code, or the like.

It is noted that in this exemplary scenario, the message data may be processed at the software component 118 (if the validity of the message data could be confirmed) and do not have to be forwarded to the software component 120 for processing purposes.

(b) The software component 118 after having received the message data (see connection 132) and/or the MAC signature (see connection 131) may set a timer to wait for the signature 152. If the signature 152 does not arrive within a predetermined amount of time, the software component 118 assumes that the message data were incorrect. It may then convey the information about such incorrect message data to the software component 120 or to any other (software) component. It may also issue a (alarm) notification indicating data corruption.

(c) Similar to the scenario described under a) above, the software component 118 may send a message to the destination software component 120 to set a timer and to determine a time-out in case no signature 152 arrived within the time limit set.

(d) Furthermore, the MAC result may be included in the signature 152. For example, the signature 152 being correctly calculated at the security processor 117 may indicate the integrity of the message data received at the security processor 117. If the integrity of the message data could not be confirmed, the security processor 117 may calculate a wrong signature 152 on the data received. Such a wrong signature 152 may be any information that with a high probability would indicate to the software component 118 and/or 120 that the message data obtained does not correspond to this wrong signature 152.

(e) The MAC result may be conveyed, e.g., as a fail/pass information from the security processor 117 towards the software components 118 and/or 120. Such information may be conveyed separately or via data associated with or combined with the signature 152.

(f) It is in particular an option to convey the MAC result in case the security processor 117 determines that the message data are not valid. In such example, a fail information as the MAC result and no signature 152 may be conveyed from the security processor 117 towards the software components 118 and/or 120. In case the security processor 117 determines that the message data are valid, the signature 152 may be conveyed towards the software components 118 and/or 120 and no MAC result may have to be transmitted towards the software components 118 and/or 120.

Figure 2:
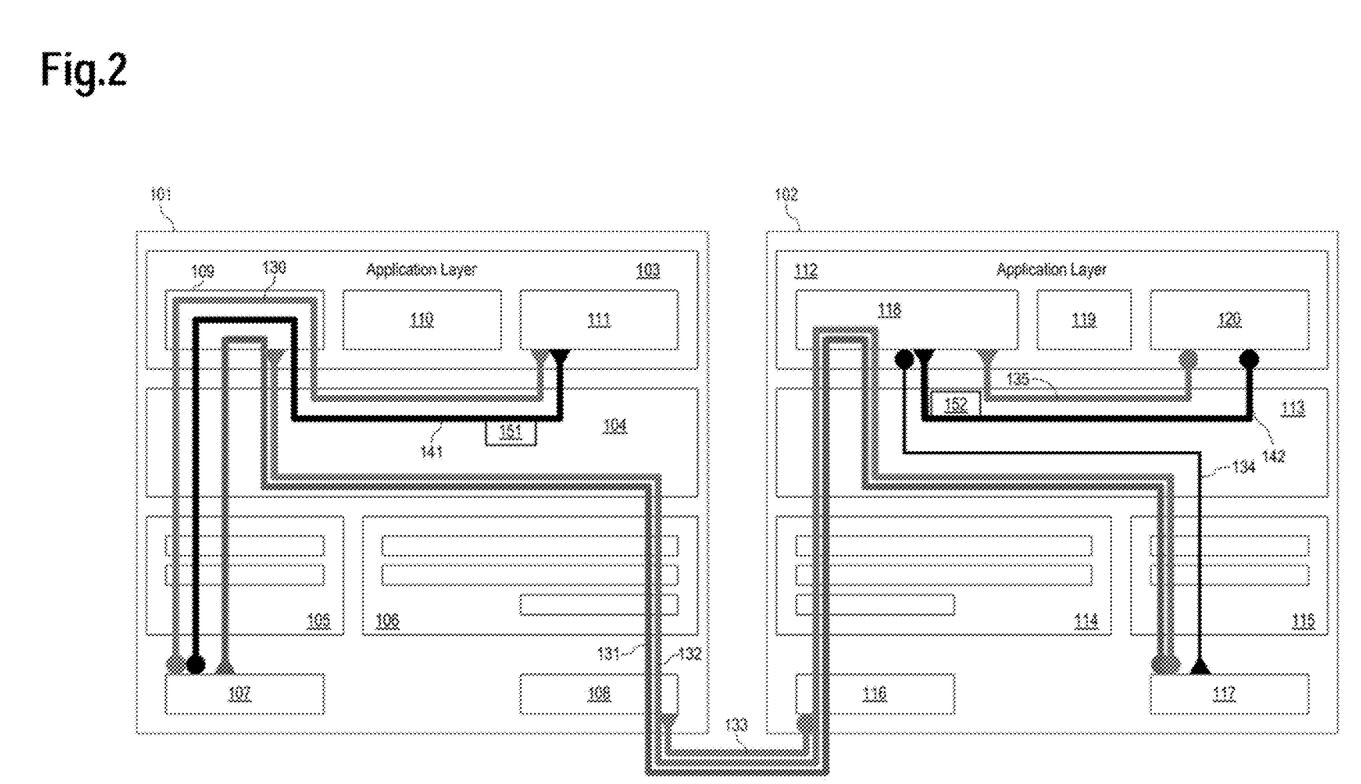
FIG. 2 shows a variation of the diagram visualized in FIG. 1, wherein the internal signature on the receiving side is generated at a software component.

It is also an option that the signature 152 is not calculated at the security processor 117, but at the software component 118 that conveys the message data to the subsequent software component 120. In such case, the software component 118 may be informed via the MAC result of the integrity of the message data received at the security processor. If the MAC result confirms the integrity, the software component may determine the signature 152 and convey it along or in parallel with the message data to the software component 120. In such scenario, depicted exemplarily in FIG. 2, the connection 142 starts at the software component 118 and ends at the software component 120 and (as an option) the connection 134 may start at the security processor 117 and end at the software component 118.

The signature(s) mentioned herein may in particular comprise an electronic signature that is an electronic means indicating the data received correspond to the data sent. The signature may in particular be determined by a function that calculates a unique code (or a substantially unique code) based on the data. Hence, every data may (with a high probability) result in a different code based on said function. Receiving the data and the signature allows using the function on the data to determine a code and comparing the code with the signature. If the code equals the signature, the data is regarded valid (the integrity of the data can be confirmed). Otherwise, the data has been corrupted, e.g., by traversing a layer of the device.

In addition, the function may be a secret or the function may use a secret to calculate the code (i.e. the signature). Hence, the signature may advantageously utilize a security feature to avoid (or reduce the risk of successful) third party attacks on the integrity of the data conveyed across devices via, e.g., a network.

The signature may comprise, e.g., a hash value for the data, which may be encrypted, e.g., signed by a private key. The encrypted hash may be added together with the corresponding public key to the data. On the receiving side, the encrypted hash may be processed by using the public key to determine the hash. Also, the hash on the data is determined and the two hash values are compared. If they are identical, the data is deemed to be valid. Instead of public key cryptography utilizing a public and a private key per device, a secret between two (or more) devices (key) can be used for encryption purposes.

The signature may thus be at least one of the following:
a hash-code;
a cryptographic hash-code;
a security code;
a safety code;
a cyclic redundancy code.

Each of the devices 101 or 102 may be part of a control unit of, e.g., a vehicle. The software components of the application layer may be threads responsible for monitoring or surveillance tasks. For example, the software component 120 may be an airbag monitoring thread or a control thread used for steering purposes of a vehicle.

The device 101, 102 may be realized as an integrated circuit, in particular as a processor or a microcontroller. Such integrated circuit may in particular comprise the security processor 108, 117.

The layer 104, 113 may each be a real-time environment, e.g., a software layer that provides an application programming interface for the application layer.

The layer 105, 115 may be a cryptographic software layer comprising, e.g., a crypto service manager (CSM) and a cryptographic library module (CRY). The layer 106, 114 may be a network layer comprising, e.g., a communication layer, a protocol data router and a network stack.

The examples suggested herein may in particular be based on at least one of the following solutions. In particular combinations of the following features could be utilized in order to reach a desired result. The features of the method could be combined with any feature(s) of the device, apparatus or system or vice versa.

A device for processing data is provided, the device comprising:
    a first component, wherein the first component is arranged for receiving the data;
    a security processor for receiving said data and a first signature, wherein the security processor is arranged for determining based on the first signature whether the data are valid;

for determining a second signature for the data; and for conveying the second signature to the first component.

Hence, the first signature may be replaced by the second signature, wherein the second signature may be verified for the data by the first component. It is in particular an option that the first signature has a higher complexity than the second signature. The first signature may be a cryptographic signature.

Advantageously, the second signature may be used to detect a corruption of the data that are conveyed within the device after they were received at the security processor. This is in particular useful in case the device comprises several layers (comprising hardware and/or software components) which are traversed by said data.

The data received at the device may be conveyed via at least one layer before arriving at the security processor. Also, such data may be conveyed across at least one layer of the device before arriving at the first component. The communication between the security processor and the first component may involve at least one layer of the device.

In an embodiment, the device further comprises a second component, wherein the first component is arranged for conveying the data and the second signature to the second component.

The first component may thus utilize the second signature as a device-internal signature to convey the data towards the second component. The second component is able, based on the second signature, to confirm the validity of the data received or to determine that the data received are corrupt.

The communication between the first component and the second component may involve at least one layer of the device. Each layer of the device may comprise at least one software and/or hardware layer.

In an embodiment, the first component is arranged for conveying the second signature to the second component in case the data are valid.

The first component may determine based on the second signature whether or not the data are valid.

In an embodiment, the first component is arranged for not conveying the second signature to the second component in case the data are not valid.

In an embodiment, the security processor is arranged for conveying the second signature to the second component via the first component.

In an embodiment, the second component is arranged to verify the integrity of the data based on the second signature.

In an embodiment, the first component is arranged for conveying the data to the second component via at least one software layer.

In an embodiment, the security processor is arranged for conveying the second signature to the first component in case the data are valid.

In an embodiment, the security processor is arranged for not conveying the second signature to the first component in case the data are not valid.

In an embodiment, the device further comprises at least one software layer, wherein the security processor conveys a result indicating whether the data are valid and the second signature to the first component via the least one software layer.

In an embodiment, the second signature comprises an information whether the data are valid or whether the data are not valid.

In an embodiment, the first and/or the second signature and/or the third signature (see below) comprises at least one of the following:

a hash-code;

a cryptographic hash-code;

a security code;

a safety code;

a cyclic redundancy code.

In an embodiment, the first component is arranged for initiating a first action in case the data are valid or initiating a second action in case the data are not valid.

In an embodiment, the second component is arranged for initiating a first action in case the data are valid.

In an embodiment, the first component is a software component of an application layer.

In an embodiment, the second component is a software component of an application layer.

In particular, the first component and/or the second component may be (or comprise) a hardware component of the device.

In an embodiment, the device is an integrated device, a microprocessor or a microcontroller.

In an embodiment, the device is connected to at least one other device via a network interface.

Also, a device is suggested for processing data, the device comprising:

a first component, wherein the first component is arranged for receiving the data;

a second component;

a security processor for receiving said data and a first signature, wherein the security processor is arranged for determining based on the first signature whether the data are valid;

for informing the first component whether the data are valid;

wherein the first component is arranged for determining a second signature for the data and for conveying the second signature and the data to the second component.

Hence, the second signature may be determined at the first component and conveyed to the second component (if, e.g., the information may indicate that the data are valid), in particular via at least one software or hardware layer. The second component may then verify the integrity of the data based on the second signature and initiated a predefined action based on the data received. It is an option that the second signature may only be conveyed to the second component in case the security processor indicates to the first component that the data received at the security processor are valid. Otherwise, the first component may not calculate and send the second signature to the second component.

In an embodiment, the first component is arranged for determining the second signature for the data and for conveying the second signature and the data to the second component if the data are valid.

In an embodiment, the security processor is arranged for informing the first component whether the data are valid via a message conveyed to the first component.

In an embodiment, the security processor is arranged for informing the first component whether the data are not valid by not sending a message to the first component.

The first component, not receiving a message within a time window that was reset when the data was received at the first component, may decide that the integrity of the data (received at the security processor) was not confirmed. In such case (also referred to as "time-out"), the first component may issue a notification (indicating, e.g., a failure of the data's integrity) to, e.g., the second component. In such case, the first component may in particular not convey the data or the second signature towards the second component. This mechanism may advantageously ensure that the second component may not receive the data and hence not be able to conduct a predetermined action associated with the data (because of potentially corrupted data).

Also, a device is suggested for processing data, the device comprising:
- a security processor,
- a first component, wherein the first component is arranged for conveying said data and a third signature to the security processor,
- wherein the security processor is arranged
  - for determining based on the third signature whether the data are valid;
  - for determining a first signature;
  - for conveying the data and the first signature towards a network.

Advantageously, the third signature may be used to detect a corruption of the data that are conveyed within the device before them being received at the security processor. This is in particular useful in case the device comprises several layers (comprising hardware and/or software components) which are traversed by said data. The first component may thus utilize the third signature as a device-internal signature to convey the data towards the security processor. The security processor is able, based on the third signature, to confirm the validity of the data received or to determine that the data received are corrupt.

In an embodiment, the data and the first signature are conveyed towards the network, in particular towards a further device via said network, in case the integrity of the data has been confirmed via the third signature and not conveying the data and the first signature in case the integrity of the data has not been confirmed via the third signature.

In an embodiment, the first component is arranged to determine the third signature based on the data.

In an embodiment, the data and the first signature are conveyed to at least one other device via a network interface.

A method is provided for processing data at a device, said method comprising:
- receiving the data and a first signature at a security processor of the device;
- receiving the data at a first component;
- determining by the security processor based on the first signature whether the data are valid;
- determining a second signature for the data;
- conveying the second signature to the first component.

In an embodiment, the method further comprises at least one of the following:
- determining the second signature by the security processor;
- conveying the second signature from the security processor to the first component;
- verifying the integrity of the data at the first component based on the second signature;
- initiating a first action by the first component in case the data are valid or initiating a second action by the first component in case the data are not valid.

The first action may be processing the data or conduct a predetermined action that is triggered by the data. The first action may be forwarding the data and the second signature to a second component (via at least one layer of the device).

The second action may be issuing a notification that indicates that the data are corrupt.

In an embodiment, the method further comprises:
- conveying the second signature from the security processor to a second component via the first component.

In an embodiment, the method further comprises:
- verifying the integrity of the data at the second component based on the second signature.

In an embodiment, the method further comprises:
- conveying the data and the signature from the first component to a second component.

A method is provided for processing data at a device, said method comprising:
- receiving the data and a first signature at a security processor of the device;
- receiving the data at a first component of the device;
- determining by the security processor based on the first signature whether the data are valid;
- determining by the first component whether the data are valid based on an information provided by the security processor;
- determining a second signature for the data by the first component;
- conveying the second signature and the data to the second component.

The second signature and the data may in particular be conveyed from the first component to the second component in case the information provided by the security processor indicates that the data are valid. The second component may verify the integrity of the data based on the second signature. In case of valid data, the second component may process the data.

It is in particular noted that the features described with regard to the device claims are applicable for the method claims accordingly. The generally applies for claims of different or identical categories.

A device is provided comprising:
- means for receiving the data and a first signature at a security processor of the device;
- means for receiving the data at a first component;
- means for determining by the security processor based on the first signature whether the data are valid;
- means for determining a second signature for the data;
- means for conveying the second signature to the first component.

A device is provided comprising:
- means for receiving the data and a first signature at a security processor of the device;
- means for receiving the data at a first component of the device;
- means for determining by the security processor based on the first signature whether the data are valid;
- means for determining by the first component whether the data are valid based on an information provided by the security processor;
- means for determining a second signature for the data by the first component;
- means for conveying the second signature and the data to the second component.

A computer program product directly loadable into a memory of a digital processing device, comprising software code portions for performing the steps of any of the methods as described herein.

In one or more examples, the functions described herein may be implemented at least partially in hardware, such as specific hardware components or a processor. More generally, the techniques may be implemented in hardware, processors, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium, i.e., a computer-readable transmission medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more central processing units (CPU), digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a single hardware unit or provided by a collection of interoperative hardware units, including one or more processors as described above, in conjunction with suitable software and/or firmware.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. It should be mentioned that features explained with reference to a specific figure may be combined with features of other figures, even in those cases in which this has not explicitly been mentioned. Further, the methods of the invention may be achieved in either all software implementations, using the appropriate processor instructions, or in hybrid implementations that utilize a combination of hardware logic and software logic to achieve the same results. Such modifications to the inventive concept are intended to be covered by the appended claims.

The invention claimed is:

1. A device for processing message data comprising:
   a network interface configured to:
      receive, from another device, the message data, a first signature corresponding to the message data, and a third signature corresponding to the message data and the first signature, wherein the third signature is a signature generated by another network interface of the other device based on the message data and the first signature;
      verify an integrity of the message data and the first signature based on the third signature;
   a first component configured to receive the message data and the first signature from the other device via the network interface; and
   a security processor configured to:
      receive the message data and the first signature from the network interface via the first component;
      determine, based on the first signature, whether the message data is valid;
      determine a second signature corresponding to the message data; and
      convey the second signature to the first component.

2. The device according to claim 1, further comprising a second component, the first component being configured to convey the message data and the second signature to the second component.

3. The device according to claim 2, wherein the first component is configured to convey the second signature to the second component if the message data is valid.

4. The device according to claim 3, wherein the first component is configured not to convey the second signature to the second component if the message data is invalid.

5. The device according to claim 1, wherein the security processor is configured to convey the second signature to the second component via the first component.

6. The device according to claim 5, wherein the second component is configured to verify the integrity of the message data based on the second signature.

7. The device according to claim 5, wherein the first component is configured to convey the message data to the second component via at least one software layer.

8. The device according to claim 1, wherein the security processor is configured to convey the second signature to the first component if the message data is valid.

9. The device according to claim 8, wherein the security processor is configured to not convey the second signature to the first component if the message data is invalid.

10. The device according to claim 1, further comprising at least one software layer, wherein the security processor is configured to convey a result indicative of a validity of the message data and the second signature to the first component via the least one software layer.

11. The device according to claim 1, wherein the second signature comprises information indicative of a validity of the message data.

12. The device according to claim 1, wherein the first signature, the second signature, and/or the third signature comprises at least one of the following:
a hash-code;
a cryptographic hash-code;
a security code;
a safety code; and
a cyclic redundancy code.

13. The device according to claim 1, wherein the first component is configured to:
initiate a first action if the message data is valid; and
initiate a second action if the message data is invalid.

14. The device according to claim 1, wherein the second component is configured to:
initiate a first action if the message data is valid.

15. The device according to claim 1, wherein the first component is a software component of an application layer.

16. The device according to claim 1, wherein the second component is a software component of an application layer.

17. The device according to claim 1, wherein the device is an integrated device, a microprocessor or a microcontroller.

18. The device according to claim 1, wherein the device is connected to the other device via a connection between the network interface and the other network interface of the other device.

19. A device for processing message data comprising:
a network interface configured to:
receive, from another device, the message data, a first signature corresponding to the message data, and a third signature corresponding to the message data and the first signature, wherein the third signature is a signature generated by another network interface of the other device based on the message data and the first signature;
verify an integrity of the message data and the first signature based on the third signature;
a first component configured to receive the message data and the first signature from the other device via the network interface;
a second component; and
a security processor configured to:
receive the message data and the first signature from the network interface via the first component;
determine, based on the first signature, whether the message data is valid; and
inform the first component whether the message data is valid;
wherein the first component is further configured to determine a second signature for the message data and convey the second signature and the message data to the second component.

20. The device according to claim 19, wherein the first component is configured to determine the second signature for the message data and convey the second signature and the message data to the second component if the message data is valid.

21. The device according to claim 19, wherein the security processor is configured to inform the first component whether the message data is valid via a message conveyed to the first component.

22. The device according to claim 19, wherein the security processor is configured to send a message to the first component to inform the first component whether the message data is invalid.

23. A device for processing message data comprising:
a network interface configured to generate a third signature based on the message data received from another device and a first signature corresponding to the message data, wherein the message data and the first signature are verifiable using the third signature;
a security processor, and
a first component configured to convey the message data and a second signature generated based on the message data to the security processor,
wherein the security processor is configured to:
determine, based on the second signature, whether the message data received from the first component is valid;
generate the first signature for the message data in response to the message data being determined valid using the second signature;
provide the message data, the third signature, and the first signature to the other device via the network interface.

24. The device according to claim 23, wherein the security processor is configured to:
provide the message data, the third signature, and the first signature to the other device if the integrity of the message data has been confirmed via the first signature.

25. The device according to claim 23, wherein the first component is configured to determine the second signature based on the message data.

26. The device according to claim 23, wherein the third signature, the message data, the third signature, and the first signature are provided to the other device via a network that is interfaced with the network interface.

27. A method for processing message data at a device including a security processor, a network interface, and a first component, said method comprising:
receiving, by the network interface, the message data, a first signature corresponding to the message data, and a third signature corresponding to the message data and the first signature, wherein the third signature is a signature generated by another network interface of another device based on the message data and the first signature;
verifying, by the network interface of the device, an integrity of the message data and the first signature based on the third signature;
receiving, via the network interface of the device, the message data and the first signature at the first component of the device from the other device;
receiving, via the first component, the message data and the first signature at the security processor from the network interface;
determining, by the security processor based on the first signature, whether the message data is valid;
determining a second signature for the message data; and
conveying the second signature to the first component.

28. The method according to claim 27, wherein:
the second signature is determined by the security processor;

the second signature is conveyed from the security processor to the first component; and the method further comprises:
  verifying the integrity of the message data at the first component based on the second signature; and
  initiating, by the first component:
    a first action if the message data is valid; and
    a second action if the message data is invalid.

29. The method according to claim 27, further comprising:
  conveying the second signature from the security processor to a second component via the first component.

30. The method according to claim 29, further comprising:
  verifying the integrity of the message data at the second component based on the second signature.

31. The method according to claim 27, further comprising:
  conveying the message data and the second signature from the first component to a second component.

32. A method for processing message data at a device including a security processor, a network interface, and a first component, said method comprising:
  receiving, by the network interface, the message data, a first signature corresponding to the message data, and a third signature corresponding to the message data and the first signature, wherein the third signature is a signature generated by a network interface of another device based on the message data and the first signature;
  verifying, by the network interface of the device, an integrity of the message data and the first signature based on the third signature;
  receiving, via the network interface of the device, the message data and the first signature at the first component of the device from the other device;
  receiving, via the first component, the message data and the first signature at the security processor from the network interface;
  determining, by the security processor based on the first signature, whether the message data is valid;
  determining, by the first component, whether the message data is valid based on information provided by the security processor;
  determining a second signature for the message data by the first component; and
  conveying the second signature and the message data to the second component.

33. A device comprising:
  means for receiving, at a network interface, message date, a first signature corresponding to the message data, and a third signature, from another device, wherein the third signature corresponds to the message data and the first signature, and is a signature generated by a network interface of the other device based on the message data and the first signature;
  means for verifying an integrity of the message data and the first signature based on the third signature;
  means for receiving, via the network interface, the message data and the first signature from the other device at the first component;
  means for receiving message data and the first signature from the network interface at a security processor of the device via the first component;
  means for determining, by the security processor based on the first signature, whether the message data is valid;
  means for determining a second signature for the message data; and
  means for conveying the second signature to the first component.

34. A non-transitory computer program product directly loadable into a memory of a digital processing device, comprising software code portions for performing the steps of the method according to claim 27.

35. A non-transitory computer program product directly loadable into a memory of a digital processing device, comprising software code portions for performing the steps of the method according to claim 32.

* * * * *